(12) United States Patent
Ahluwalia

(10) Patent No.: US 9,311,604 B2
(45) Date of Patent: *Apr. 12, 2016

(54) REJECTION NOTIFICATION TO THE UICC

(71) Applicant: AT&T Mobility II LLC, Atlanta, GA (US)

(72) Inventor: Inderpreet Singh Ahluwalia, Austin, TX (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/603,116

(22) Filed: Jan. 22, 2015

(65) Prior Publication Data

US 2015/0134587 A1 May 14, 2015

Related U.S. Application Data

(63) Continuation of application No. 12/242,019, filed on Sep. 30, 2008, now Pat. No. 8,971,884.

(51) Int. Cl.
*H04W 4/00* (2009.01)
*G06N 5/04* (2006.01)
*H04W 60/06* (2009.01)
*H04W 80/06* (2009.01)

(52) U.S. Cl.
CPC .............. *G06N 5/048* (2013.01); *H04W 60/06* (2013.01); *H04W 80/06* (2013.01)

(58) Field of Classification Search
CPC ....... H04W 60/06; H04W 80/06; H04W 4/02; H04W 48/04; H04W 60/00; H04W 64/00; H04W 8/02; H04W 8/04; H04W 8/06; H04W 76/027; H04W 4/003; H04W 8/183; G06N 5/048; G06N 5/04; G06N 5/00; H04M 15/85; H04M 15/86; H04M 2215/815; G06F 21/77

USPC ............... 455/435.1, 423, 425; 370/242; 379/433.09

See application file for complete search history.

(56) References Cited

U.S. PATENT DOCUMENTS

| | | | |
|---|---|---|---|
| 5,915,225 A | 6/1999 | Mills | |
| 6,160,903 A * | 12/2000 | Hamid et al. | 382/115 |
| 6,387,027 B1 | 5/2002 | Bodin | |
| 6,498,861 B1 * | 12/2002 | Hamid et al. | 382/124 |
| 7,177,642 B2 * | 2/2007 | Sanchez Herrero et al. | 455/435.1 |
| 7,614,043 B2 * | 11/2009 | Ognev | G06F 11/366 717/126 |
| 7,778,632 B2 * | 8/2010 | Kurlander | H04M 1/72566 455/418 |
| 7,788,227 B1 * | 8/2010 | Nettleton | G06F 9/541 707/640 |

(Continued)

OTHER PUBLICATIONS

Office Action dated Jun. 23, 2011 for U.S. Appl. No. 12/242,019, 22 pages.

(Continued)

*Primary Examiner* — Meless Zewdu
(74) *Attorney, Agent, or Firm* — Amin, Turocy & Watson, LLP

(57) ABSTRACT

Registration rejections are reported to a universal integrated circuit card (UICC). Remote access can be provide to registration rejection data stored in the UICC, the registration rejection data can be transmitted to a service provider, one or more UICC applications can be executed based on the registration rejection data, and/or the registration rejection data can be logged or tracked. In addition, action taken by the UICC can be automated based on the registration rejection using artificial intelligence.

20 Claims, 10 Drawing Sheets

(56) References Cited

U.S. PATENT DOCUMENTS

| | | | |
|---|---|---|---|
| 7,873,959 B2* | 1/2011 | Zhu | G06F 8/65 717/172 |
| 8,099,429 B2* | 1/2012 | Deyo | G06F 17/30867 707/776 |
| 2001/0053688 A1 | 12/2001 | Rignell et al. | |
| 2003/0032408 A1* | 2/2003 | Jennings | 455/412 |
| 2004/0019787 A1* | 1/2004 | Shibata | 713/168 |
| 2005/0009520 A1 | 1/2005 | Herrero et al. | |
| 2005/0015505 A1 | 1/2005 | Kruis et al. | |
| 2005/0227720 A1* | 10/2005 | Gunaratnam et al. | 455/510 |
| 2005/0273399 A1* | 12/2005 | Soma et al. | 705/26 |
| 2007/0287419 A1 | 12/2007 | Wang | |
| 2008/0146280 A1* | 6/2008 | Sasse et al. | 455/558 |
| 2010/0120422 A1* | 5/2010 | Cheung et al. | 455/434 |
| 2013/0064101 A1 | 3/2013 | Flynn et al. | |

OTHER PUBLICATIONS

Office Action dated Dec. 6, 2011 for U.S. Appl. No. 12/242,019, 17 pages.

Office Action dated Mar. 27, 2012 for U.S. Appl. No. 12/242,019, 15 pages.

Office Action dated Aug. 29, 2012 for U.S. Appl. No. 12/242,019, 23 pages.

Office Action dated Jan. 30, 2014 for U.S. Appl. No. 12/242,019, 41 pages.

Office Action dated Jul. 1, 2014 for U.S. Appl. No. 12/242,019, 28 pages.

* cited by examiner

REJECTION NOTIFICATION TO THE UICC

CROSS-REFERENCE TO RELATED APPLICATIONS

This application is a continuation of, and claims priority to, U.S. patent application Ser. No. 12/242,019, entitled "REJECTION NOTIFICATION TO THE UICC," and filed Sep. 30, 2008, the entirety of which application is hereby incorporated herein by reference.

TECHNICAL FIELD

The subject application relates generally to the telecommunications industry, and more particularly to apparatus and methodologies for sending rejection notifications to the UICC.

BACKGROUND

Optimization of network coverage and service quality are constant goals for wireless network operators. Superior coverage and service quality results in enhanced user experiences, greater throughput, and ultimately increased revenue. One way to achieve superior coverage and service quality is through increased access management and reporting capability.

The ability to quickly and consistently diagnosis access and connectivity issues is of high monetary significance for service providers, and is generally desirable for efficient and effective handling of technical issues. This is largely dependent on the ability to accurately retrieve desired information or data regarding network connectivity. Currently, when a mobile device's attempted registration is rejected from a network it can be difficult for the service provider to ascertain why the rejection occurred. Sometimes the rejections are valid, and other times the rejections can be accidental.

Often times when a registration attempt is rejected, the mobile device will display a message to the user. However, the inability of service providers to consistently and quickly determine why a rejection has occurred can cause unnecessary subscriber downtime, as well as consumer frustration. Unfortunately, conventional techniques do not provide for consistent and convenient determination of the causes of a registration rejection.

DETAILED DESCRIPTION

Figure 1:
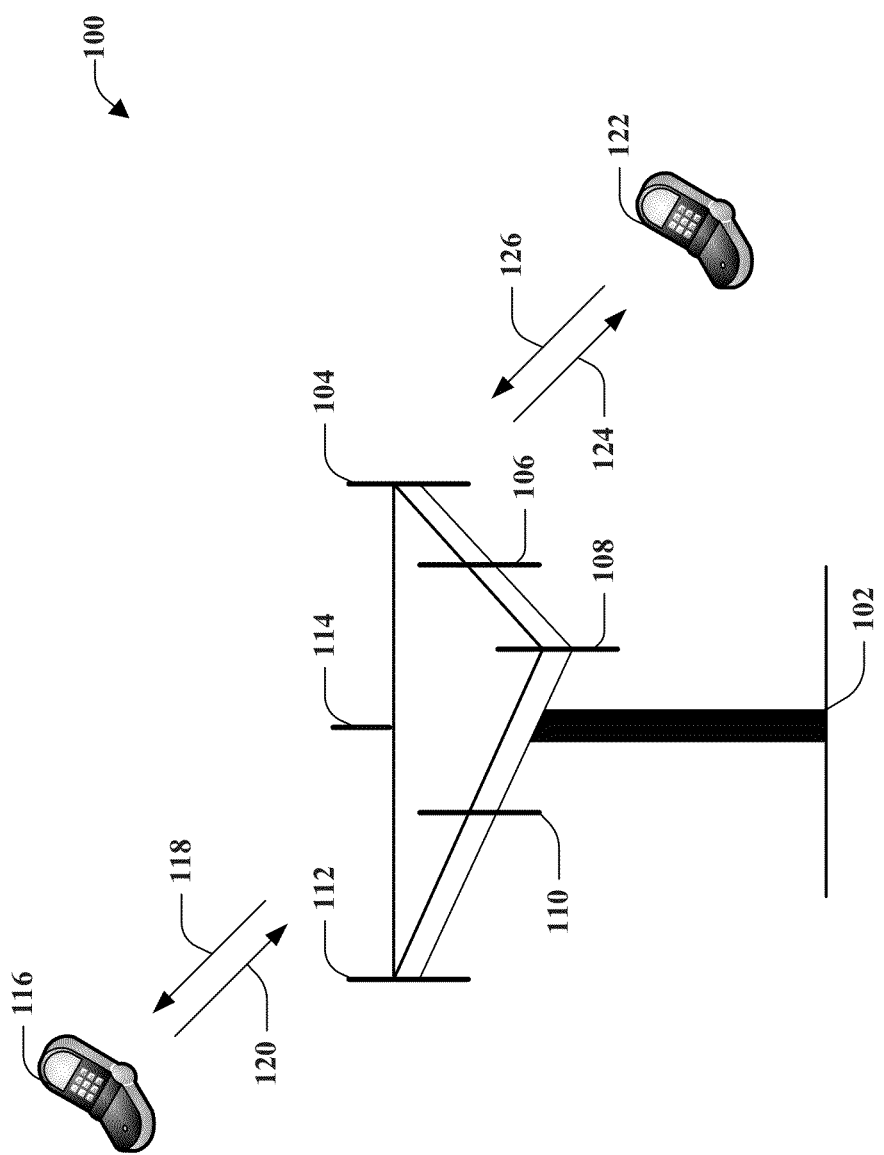
FIG. 1 illustrates an exemplary multiple access wireless communication system in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident; however, that such matter can be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

In one embodiment, a mobile device is disclosed including a registration component that obtains a registration rejection notification, and a universal integrated circuit card (UICC) component that at least one of stores data associated with the registration rejection notification, instructs the mobile device based at least in part on the registration rejection notification, or transmits data associated with the registration rejection notification.

In yet another embodiment, a method is disclosed including the steps of obtaining a registration rejection message, analyzing the registration rejection message; and determining at least one action based at least in part on a set of data related to the registration rejection message (registration rejection data) using a universal integrated circuit card (UICC).

In an alternative embodiment, a system is disclosed including means for obtaining a registration rejection message, means for analyzing the registration rejection message, and means for determining a course of action based at least in part on the registration rejection message using a universal integrated circuit card (UICC).

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from when considered in conjunction with the drawings.

Referring initially to the drawings, FIG. 1 Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. This can be provided by using a precoder to steer signals in desired directions, for example. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology in one example.

According to an example, system 100 can be a multiple-input multiple-output (MIMO) communication system. Further, system 100 can utilize substantially any type of duplexing technique to divide communication channels (e.g., forward link, reverse link, . . . ) such as FDD, TDD, and the like. Moreover, the system 100 can be a multiple-bearer system. A bearer can be an information path of defined capacity, delay, bit error rate, etc. Mobile devices 116 and 122 can each serve one or more radio bearers. The mobile devices 116 and 122 can employ uplink rate control mechanisms to manage and/or share uplink resources across the one or more radio bearers. In one example, the mobile devices 116 and 122 can utilize token bucket mechanisms to serve the radio bearers and to enforce uplink rate limitations.

Pursuant to an illustration, each bearer can have an associated prioritized bit rate (PBR), maximum bit rate (MBR) and guaranteed bit rate (GBR). The mobile devices 116 and 122 can serve the radio bearers based, at least in part, on the associated bit rate values. The bit rate values can also be employed to calculate queue sizes that account for PBR and MBR for each bearer. The queue sizes can be included in uplink resource requests transmitted by the mobile devices 116 and 122 to the base station 102. The base station 102 can schedule uplink resources for mobile device 116 and 122 based upon respective uplink requests and included queue sizes.

Figure 2:
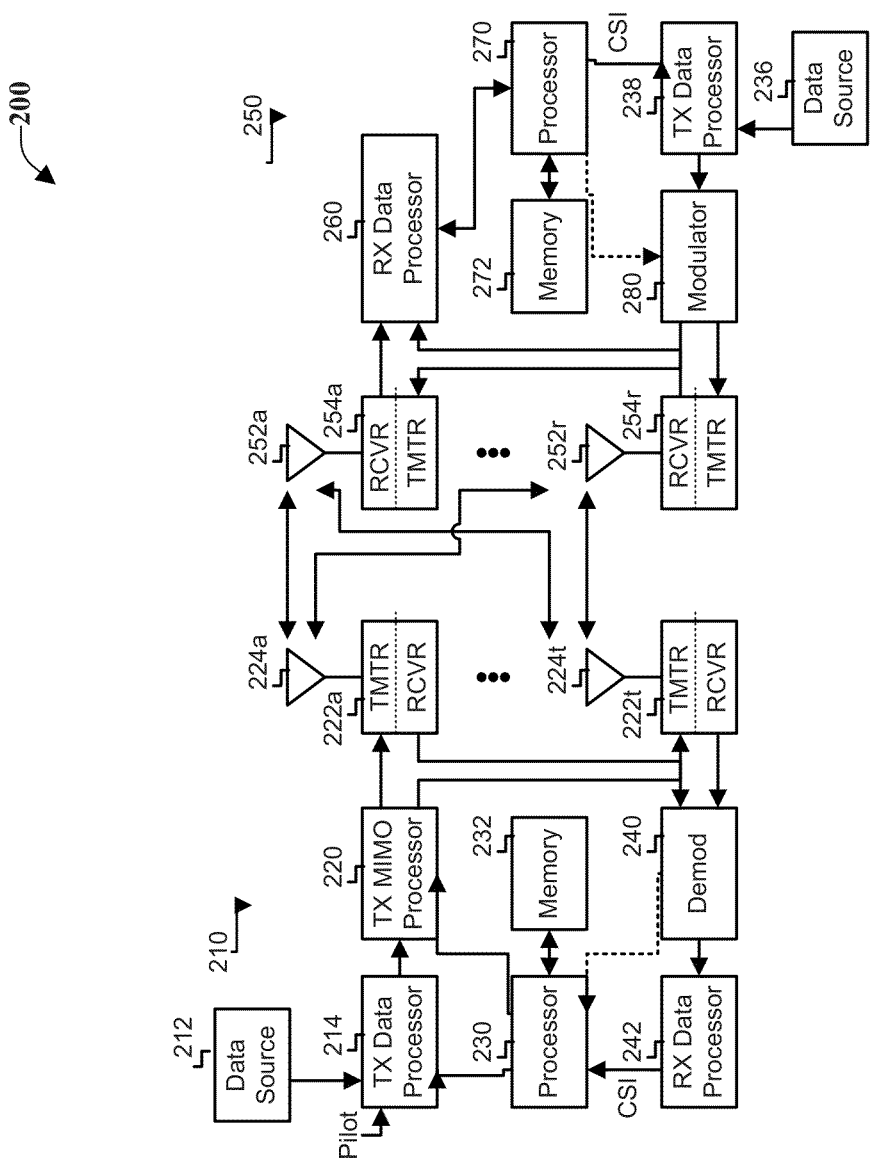
FIG. 2 illustrates a general block diagram of a communication system in accordance with an aspect of the subject specification.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmitter (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
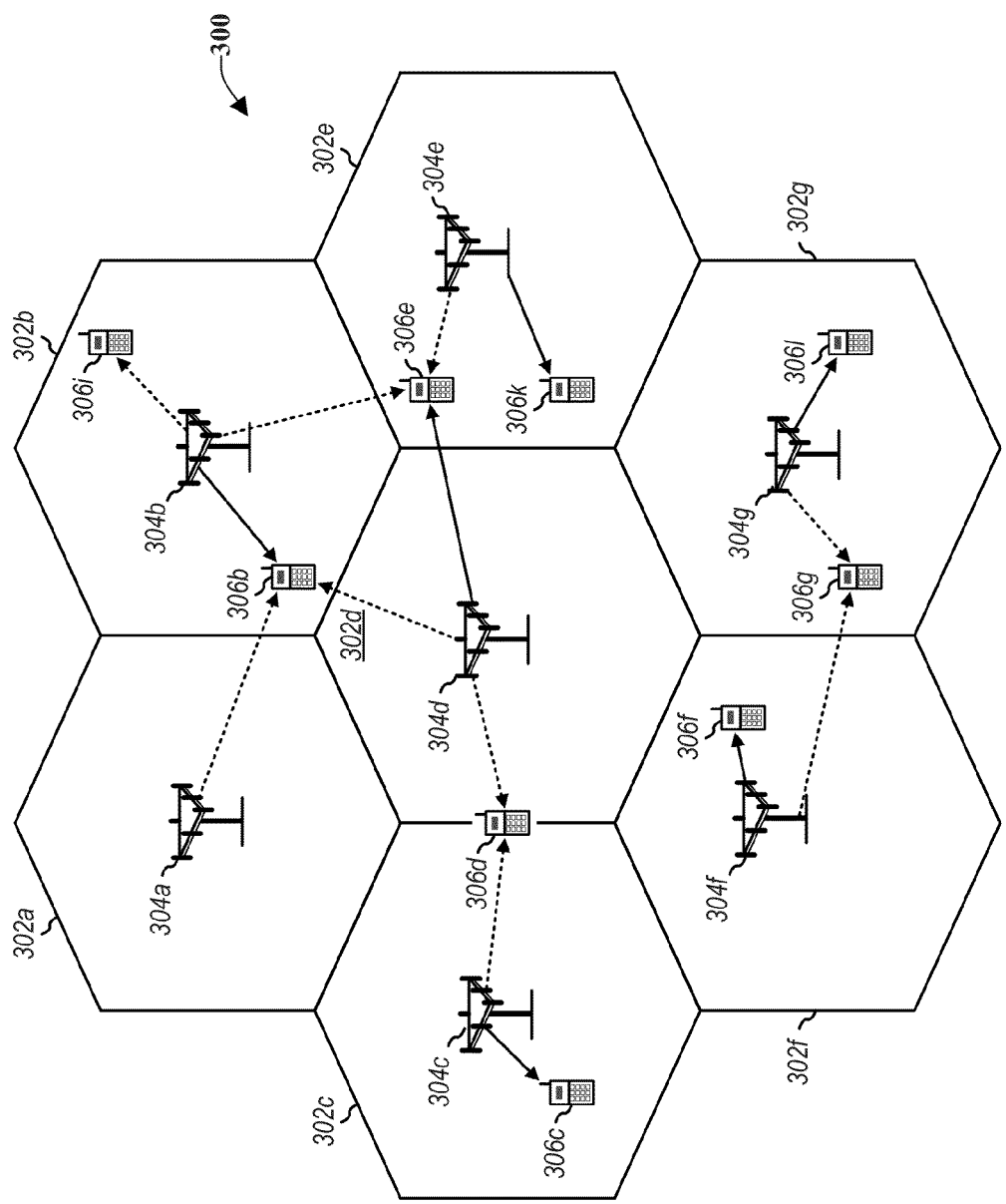
FIG. 3 illustrates an exemplary wireless communication system in accordance with an aspect of the subject specification.

FIG. 3 illustrates an exemplary wireless communication system 300 configured to support a number of users, in which various disclosed embodiments and aspects may be implemented. As shown in FIG. 3, by way of example, system 300 provides communication for multiple cells 302, such as, for example, macro cells 302a-302g, with each cell being serviced by a corresponding access point (AP) 304 (such as APs 304a-304g). Each cell may be further divided into one or more sectors (e.g. to serve one or more frequencies). Various access terminals (ATs) 306, including ATs 306a-306k, also known interchangeably as user equipment (UE) or mobile stations, are dispersed throughout the system. Each AT 306 may communicate with one or more APs 304 on a forward link (FL) and/or a reverse link (RL) at a given moment, depending upon whether the AT is active and whether it is in soft handoff, for example. The wireless communication system 300 may provide service over a large geographic region, for example, macro cells 302a-302g may cover a few blocks in a neighborhood.

The cells 302 can provide coverage via a plurality of networks, such as GSM/GPRS/Edge network (hereinafter referred to as "2G network"), and/or UMTS network (hereinafter referred to as "WCDMA coverage," "3G network," or simply as "3G"). The system 300 can have a first network in the cells, wherein the first network is the most readily available network, or can be considered the "fall back" technology having the greatest coverage area. In addition, the system 300 may have a second network that is available in a subset of the cells 302, and is not as readily available as the first network. For example, the second network may not be available in each cell 302, and/or may not cover the entire area of the cells 302 in which it is available. Users leaving the second network are provided coverage by the first network. For instance, the system 300 can include 2G and 3G networks, wherein the 2G network covers the entire system 300, and the 3G network is available in some locations throughout the system 300.

Figure 4:
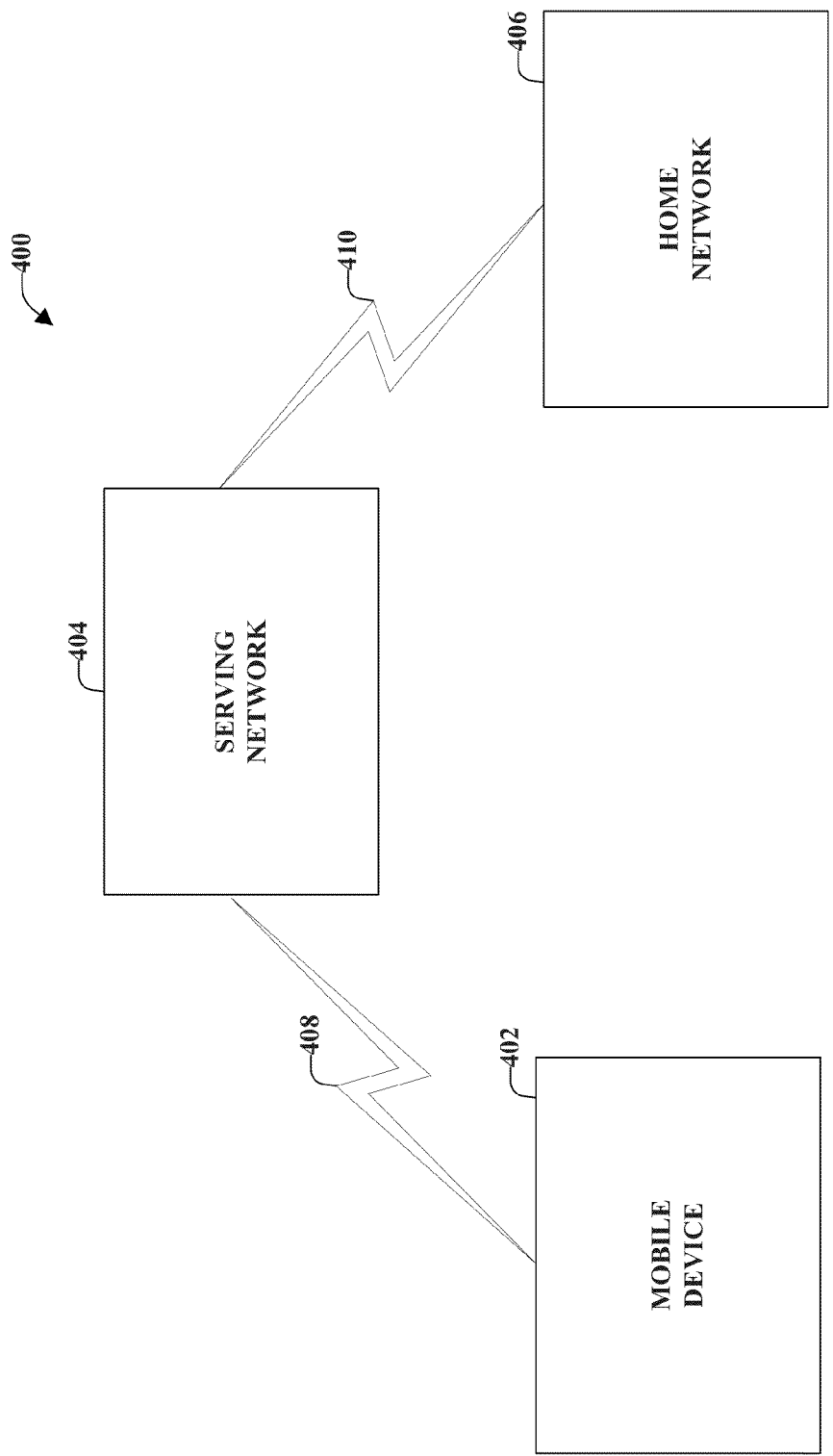
FIG. 4 is a general component block diagram illustrating a wireless network in accordance with an aspect of the present application.

FIG. 4 illustrates an example wireless communication system 400 in accordance with an aspect of the subject application. The wireless communication system 400 includes a mobile device 402, a serving network 404, and a home network 406. The mobile device 402 can be a UE (as previously discussed), a wireless phone, a smart phone, a PDA, a laptop, and so forth. In operation, the mobile device 402 sends, transmits, or otherwise communicates one or more registration messages (not shown) to the serving network 404 via a communication link 408. The registration message can include most any of a plurality of registration data, such as mobile device identifier, a subscriber identifier, subscription data, and so forth. In addition, the registration message can include a type of registration requested, such as a circuit switched registration (e.g. voice communication) or a packet switched registration (e.g. data communication).

The serving network 404 can provide wireless service to one or more mobile devices 402. For instance, the service can include voice and/or data service. The serving network 402 communicates the registration message to the home network 406 via a communication link 410. It is to be appreciated that the communication link 410 can be the same as or share properties with the communication link 408. The home network 406 authenticates the registration attempt, and instructs the serving network 404 to accept or deny the registration attempt. Based on the instruction received from the home network 406, the serving network 404 can register the mobile device 402 or reject the mobile device 402. If the mobile device's 402 registration attempt is rejected, the serving network 404 will transmit a rejection notification (e.g. location updating reject message, GPRS attach reject message, etc.) to the mobile device 402.

A registration request made by the mobile device 402 can be rejected for a plurality of reasons. For example, a mobile device 402 can be rejected for attempting to register with a serving network 404 in a location where the mobile device is not authorized to roam or where roaming is restricted. In addition, the mobile device 402 can be rejected if the mobile device has not been activated with the system operator (e.g. service provider). The rejection notification can include data regarding the status or reason of the rejection, such as a rejection cause code.

Figure 5:
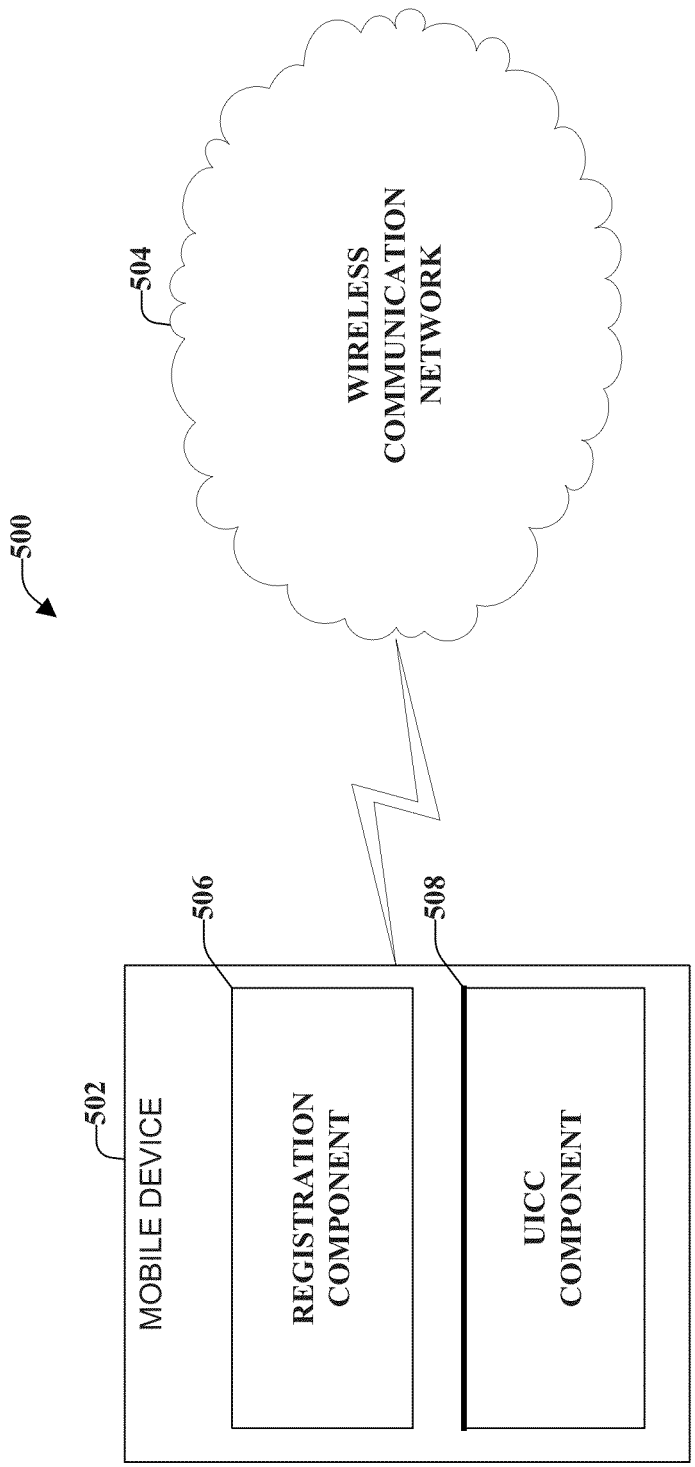
FIG. 5 illustrates an example general component block diagram of a mobile device in accordance with the subject application

Referring to FIG. 5, an example wireless communication system 500 is shown in accordance with an embodiment of the subject application. The system 500 includes a mobile device 502 and a wireless communication network 504. The mobile device 502 and wireless communication network 504 can be communicately coupled via a plurality of techniques that are well known in the art.

The mobile device 502 includes a registration component 506 and a Universal Integrated Circuit Card (UICC) Component 508. In operation, when the mobile device 502 desires to communicate with or through the wireless communication network 504, the registration component 506 transmits one or more registration request messages to the wireless communication network 504. As previously discussed, the wireless communication network 504 can determine to accept or reject the registration request based at least in part on the registration request message. For instance, the registration request message may include a subscriber identifier. Based on the subscriber identifier the wireless communication network 504 can determine whether the mobile device has sufficient access privileges to be granted registration.

In the event that the registration request is rejected, the network 504 sends a rejection notification (e.g. location updating reject message, GPRS attach reject message, etc.) to the mobile device 502. The rejection notification can include data regarding the rejection such as the type of rejection, and/or the origin of the rejection. For instance, the rejection notification can indicate whether the rejection was for a 2g or 3g network, or whether the rejection was for a circuit switched (CS) or packet switched (PS) registration request, and so forth. The registration component 506 can send the rejection notification, or a data packet containing information based on the rejection notification, to the UICC component 508.

The UICC component 508 (e.g. smart card) can process and/or store data. For instance, the UICC component 508 can obtain the rejection information, and based on the type of rejection instruct the device to take some action. Additionally, the UICC component 508 can log, track, or otherwise store the data relating to the rejection.

Figure 6:
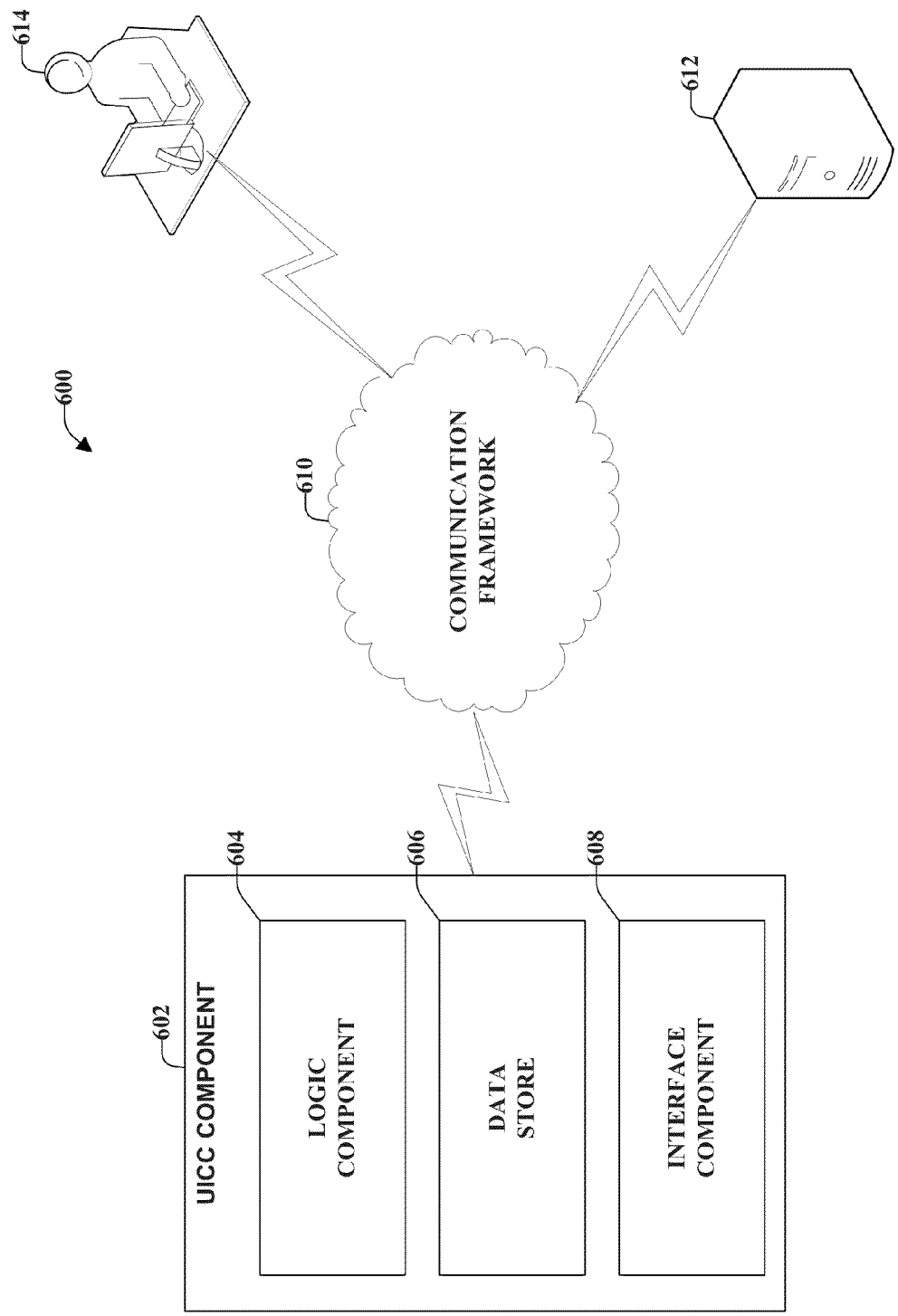
FIG. 6 illustrates an example general component block diagram of UICC component in accordance with an aspect of the subject application.

FIG. 6 illustrates an example UICC component 602 in accordance with an aspect of the subject application. The UICC component 602 includes a logic component 604, a data store 606, and an interface component 608. The logic component 604 can be an integrated circuit that is cable of processing data, wherein the UICC component 604 contains one or more applications and the logic component 604 can process the data via the applications and produce an output. The data store 606 can be a non-volatile storage memory capable of storing multiple data items, such as rejection notification data and UICC applications. The interface component 608 can include any suitable and/or necessary adapters, connectors, channels, communication paths, etc. to integrate the UICC component 602 into virtually any operating and/or database system(s). For instance, the interface component 402 can enable the UICC component 602 to communicate with a communication framework 608.

As previously discussed, the UICC component 602 can obtain registration rejection notification data. The logic component 604 can analyze the rejection notification data, and based on the rejection notification data determine an action to take based on the rejection. For instance, the logic component 604 can determine that the mobile device (not shown) should display a message to the user based on the rejection notification data, such as "this device has not been activated, please contact customer service."

Additionally or alternatively, the UICC component 602 can log, track, or otherwise store the rejection notification data in the data store 606. For instance, the UICC component 602 can report or send the rejection notification to a server 612 via the interface component 608 and communication framework 610, wherein the server 612 is associated with a service provider. The reported rejection notifications can be retrieved from the server and analyzed by the service provider.

In addition, the interface component 608 enables a customer service agent 614 to access the rejection notification data stored in the data store 606. For instance, a mobile device user may contact their service provider upon receiving a rejection notification. The customer service agent 614 can access the rejection notification data in the data store 606, and based on the rejection notification data appropriately assist the user.

Figure 7:
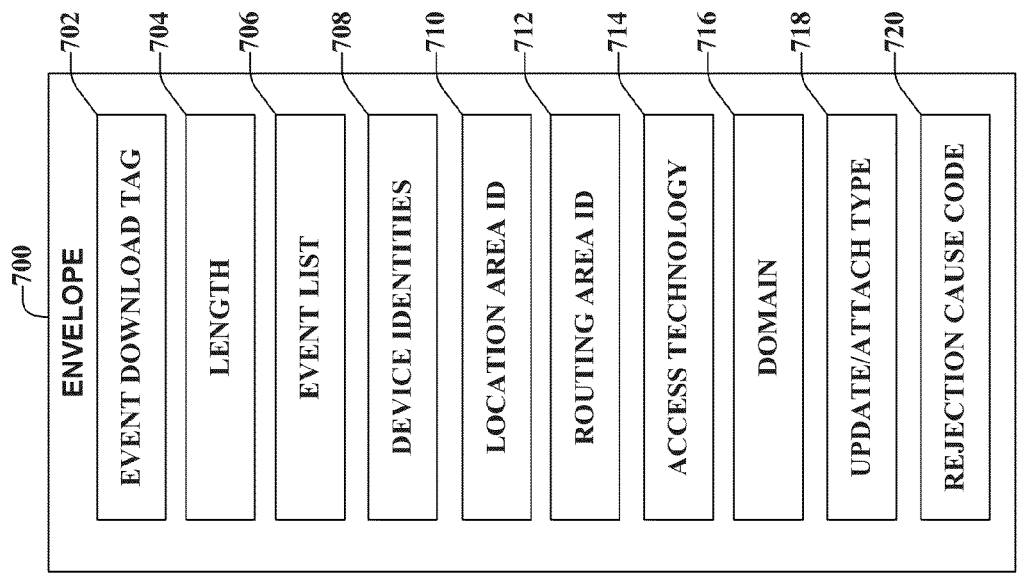
FIG. 7 illustrates an example envelope facilitating for rejection notification to the UICC in accordance with an aspect of the subject application.

FIG. 7 is an example envelope 700 for facilitating rejection notification to the UICC. The envelope 700 includes a plurality of data fields (e.g. 702-720) that facilitate the UICC in determining a course of action based on the event download. For example, the envelope 700 can include an event download tag 702, a length field 704, an event list 706, a device identities field 708, a location area identification field 710, a routing area identification 712, an access technology field 714, a domain field 716, an update/attach type field 718, and/or a rejection cause code 720.

The event download tag 702 contains data or an identifier that informs the UICC that the envelope 700 is for an event download. The length field 704 identifies the total length of the envelope 700. The length of the envelope 700 can be expressed in bytes, and can be the sum of the fields in the envelope 700. For instance, the length of the envelope 700 can be the sum of the bytes in the event list 706, plus the bytes in the device identities field 708, plus the number of bytes in either the location area identification field 710 or routing area identification field 712 (discussed infra), plus the number of bytes in the access technology field 714, plus the bytes contained in the domain field 716, plus the total bytes in update/attach field 718, and the bytes used for the rejection cause code 720.

The event list field 706 can contain an event, such as a network rejection event. The event list field 706 is set by the mobile device (e.g. UE, etc.). The device identities field 708 can contain data regarding the source and destination of the event. For instance, the device identities field 708 can include a source and destination sub-field, wherein the mobile device can set the source as being the network, and the destination as being the UICC for a network rejection event.

Additionally, the envelope can include either a location area identification field 710 that contains an identification of the location area of the rejecting network for location updating reject message, or a routing area identification field 712 containing identification information of the routing area relating to the rejecting network for a general packet radio system (GPRS) attach reject message.

The access technology field 714 can contain information relating to the access technology for the rejecting network. The domain field 716 can be used by the terminal to indicate to the UICC the domain in which the rejection was received (e.g. CS or PS). The update/attach type field 718 can contain information indicating to the UICC the update and/or attach type of the location updating request, GPRS attach request, or routing area updating request message that was sent. In the case of a location update reject message, the rejection cause code field 720 can contain the cause for rejection as received in the message. Where there is a GPRS attach reject message, the rejection cause code field 720 can contain the GMM cause information. It is to be appreciated that the subject envelope 720 is but one example of how a registration rejection can be reported to the UICC, and a plurality of techniques are possible within the scope and spirit of this application.

Figure 8:
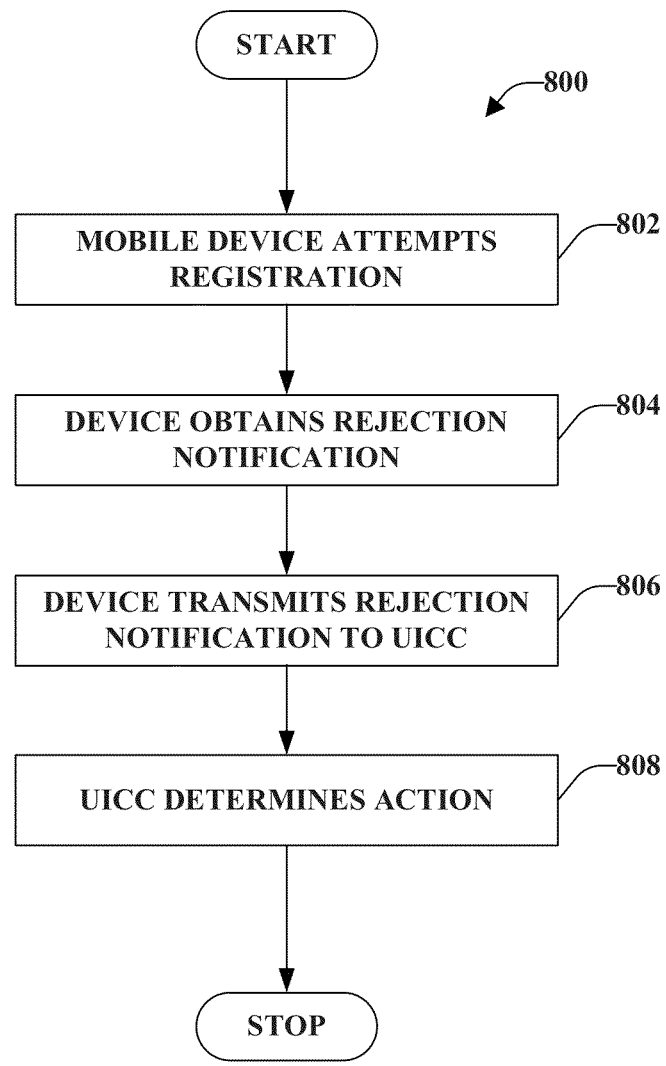
FIG. 8 illustrates an example methodology in accordance with an aspect of the subject application.

In view of the exemplary systems described supra, a methodology that may be implemented in accordance with the disclosed subject matter will be better appreciated with reference to the flow chart of FIG. 8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, the illustrated blocks do not represent all possible steps, and not all illustrated blocks may be required to implement the methodologies described hereinafter.

Referring now to FIG. 8, an example flow chart illustrating a method 800 for reporting registration rejections to the UICC is shown in accordance with an aspect of the present application. At 802, a mobile device (e.g. UE, etc.) attempts to register with a network. As discussed previously, the mobile device sends a registration message to the network requesting registration. At 804, the device obtains a rejection notification. A rejection can occur for a plurality of reasons, such as restricted roaming access or the device has not been activated.

At 806, the mobile device reports the rejection notification to the UICC. The mobile device can use an envelope structure (as illustrated in FIG. 7) to report the rejection notification to the UICC. The UICC can determine an action or a course of action to take at 808. The UICC can determine the action(s)

based at least in part on the rejection notification data or based on predetermined set of instructions. For instance, the UICC can receive the rejection notification, and based on the cause for rejection can instruct the mobile device to display a message to a user. Additionally or alternatively, the UICC can log, track, or otherwise store the rejection notifications, wherein the rejection notifications can be acquired by the service provider (as previously discussed) or transmitted to a server associated with the service provider. Moreover, the UICC can implement or run one or more applications based on the rejection data.

Figure 9:
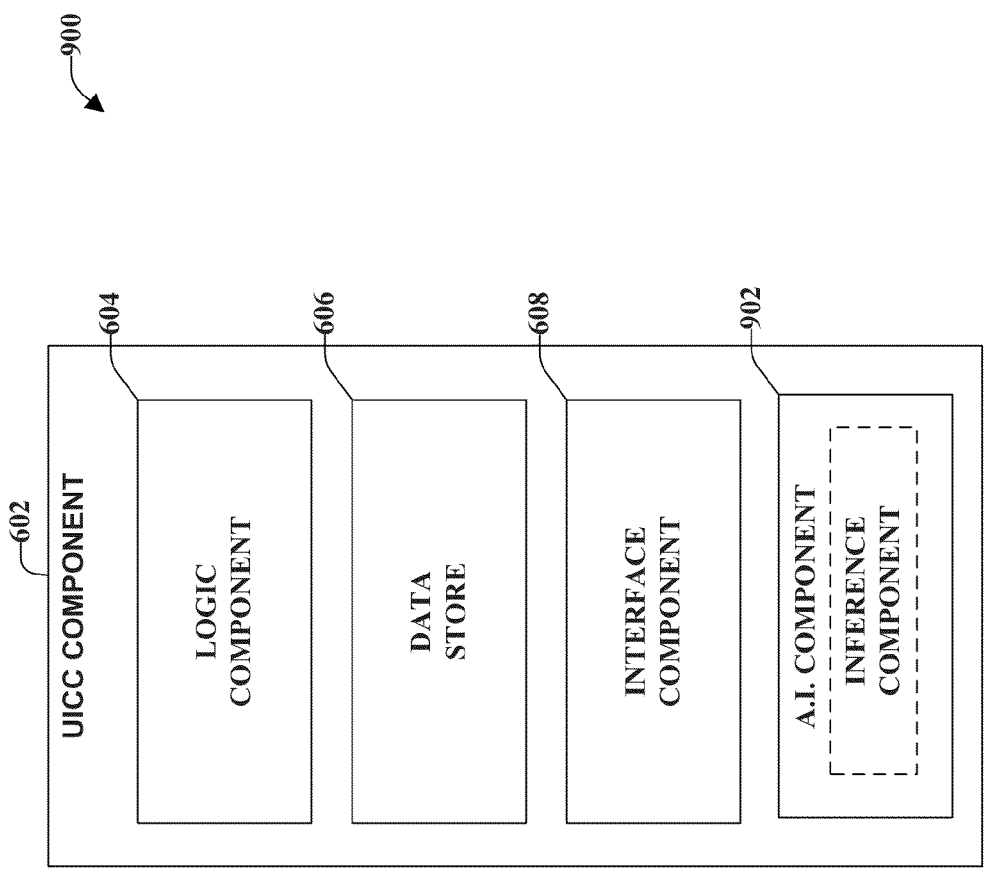
FIG. 9 illustrates an approach that employs an artificial intelligence component which facilitates automating one or more features in accordance with an alternative embodiment.

FIG. 9 illustrates an approach 900 that employs an artificial intelligence (AI) component 902 which facilitates automating one or more features in accordance with the subject application. The subject application (e.g., in connection with inferring) can employ various AI-based schemes for carrying out various aspects thereof. For example, a process for adding dithering could be facilitated by artificial intelligence.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. For instance, depending on the implementation a confidence can be assigned to the set of criteria, and an inference can be made as to the criteria that should be used as triggers for adding dithering.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject application can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g., primary versus secondary, static versus dynamic, ... ), and at what time of day to implement tighter criteria controls (e.g., in the evening when system performance would be less impacted).

Figure 10:
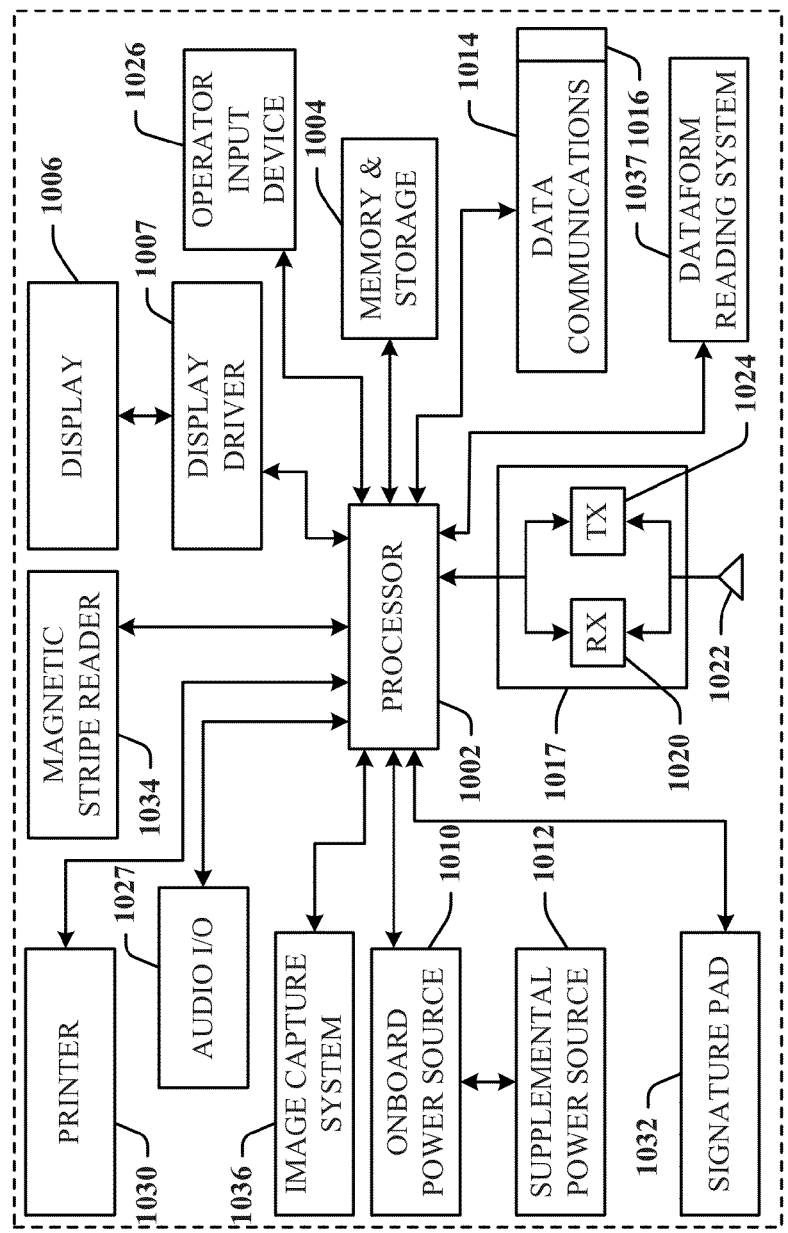
FIG. 10 illustrates an exemplary device operative to execute the one or more embodiments disclosed herein.

Referring now to FIG. 10, illustrated is a schematic block diagram of a portable hand-held terminal device 1000 according to one aspect of the application, in which a processor 1002 is responsible for controlling the general operation of the device 1000. The processor 1002 is programmed to control and operate the various components within the device 1000 in order to carry out the various functions described herein. The processor 1002 can be any of a plurality of suitable processors. The manner in which the processor 1002 can be programmed to carry out the functions relating to the application will be readily apparent to those having ordinary skill in the art based on the description provided herein.

A memory 1004 connected to the processor 1002 serves to store program code executed by the processor 1002, and serves as a storage means for storing information such as user credential and receipt transaction information and the like. The memory 1004 can be a nonvolatile memory suitably adapted to store at least a complete set of the information that is displayed. Thus, the memory 1004 can include a RAM or flash memory for high-speed access by the processor 1002 and/or a mass storage memory, e.g., a micro drive capable of storing gigabytes of data that comprises text, images, audio, and video content. According to one aspect, the memory 1004 has sufficient storage capacity to store multiple sets of information, and the processor 1002 could include a program for alternating or cycling between various sets of display information.

A display 1006 is coupled to the processor 1002 via a display driver system 1008. The display 1006 can be a color liquid crystal display (LCD), plasma display, or the like. In this example, the display 1006 is a ¼ VGA display with sixteen levels of gray scale. The display 1006 functions to present data, graphics, or other information content. For example, the display 1006 can display a set of customer information, which is displayed to the operator and can be transmitted over a system backbone (not shown). Additionally, the display 1006 can display a variety of functions that control the execution of the device 1000. The display 1006 is capable of displaying both alphanumeric and graphical characters.

Power is provided to the processor 1002 and other components forming the hand-held device 1000 by an onboard power system 1010 (e.g., a battery pack). In the event that the power system 1010 fails or becomes disconnected from the device 1000, a supplemental power source 1012 can be employed to provide power to the processor 1002 and to charge the onboard power system 1010. The processor 1002 of the device 1000 induces a sleep mode to reduce the current draw upon detection of an anticipated power failure.

The terminal 1000 includes a communication subsystem 1014 that includes a data communication port 1016, which is employed to interface the processor 1002 with a remote computer. The port 1016 can include at least one of Universal Serial Bus (USB) and IEEE 1394 serial communications capabilities. Other technologies can also be included, for example, infrared communication utilizing an infrared data port.

The device 1000 can also include a radio frequency (RF) transceiver section 1018 in operative communication with the processor 1002. The RF section 1018 includes an RF receiver 1020, which receives RF signals from a remote device via an antenna 1022 and demodulates the signal to obtain digital information modulated therein. The RF section 1018 also includes an RF transmitter 1024 for transmitting information to a remote device, for example, in response to manual user input via a user input device 1026 (e.g., a keypad) or automatically in response to the completion of a transaction or other predetermined and programmed criteria. The transceiver section 1018 facilitates communication with a transponder system, for example, either passive or active, that is in use with product or item RF tags. The processor 1002 signals (or pulses) the remote transponder system via the transceiver 1018, and detects the return signal in order to read the contents of the tag memory. In one implementation, the RF section 1018 further facilitates telephone communications using the device 1000. In furtherance thereof, an audio I/O section 1028 is provided as controlled by the processor 1002 to process voice input from a microphone (or similar audio input device) and audio output signals (from a speaker or similar audio output device).

In another implementation, the device 1000 can provide voice recognition capabilities such that when the device 1000 is used simply as a voice recorder, the processor 1002 can facilitate high-speed conversion of the voice signals into text content for local editing and review, and/or later download to a remote system, such as a computer word processor. Similarly, the converted voice signals can be used to control the device 1000 instead of using manual entry via the keypad 1026.

Onboard peripheral devices, such as a printer 1030, signature pad 1032, and a magnetic strip reader 1034 can also be provided within the housing of the device 1000 or accommodated externally through one or more of the external port interfaces 1016.

The device 1000 can also include an image capture system 1036 such that the user can record images and/or short movies for storage by the device 1000 and presentation by the display 1006. Additionally, a dataform reading system 1038 is included for scanning dataforms. It is to be appreciated that these imaging systems (1036 and 1038) can be a single system capable of performing both functions.

What has been described above includes examples of the application. It is, of course, not possible to describe every conceivable combination of components or methodologies for purposes of describing the subject application, but one of ordinary skill in the art may recognize that many further combinations and permutations of the application are possible. Accordingly, the application is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A non-transitory machine-readable storage medium, comprising executable instructions that, when executed by a processor, facilitate performance of operations, comprising:
    determining an action based on data representing a registration rejection notification associated with a mobile device;
    facilitating performance of the action using a universal integrated circuit card; and
    mapping, by an artificial intelligence component, based on the registration rejection notification and the facilitating the performance an input vector to a confidence value associated with the rejection notification, wherein the confidence value is used to trigger a dithering process associated with the input vector, in response to the confidence value being determined to have satisfied a trigger condition.

2. The non-transitory machine-readable storage medium of claim 1, wherein the confidence value is associated with a classification resulting from the mapping.

3. The non-transitory machine-readable storage medium of claim 2, wherein the classification is a result of a probabilistic analysis.

4. The non-transitory machine-readable storage medium of claim 2, wherein the classification is as a result of a statistical analysis.

5. The non-transitory machine-readable storage medium of claim 4, wherein the statistical analysis comprises an analysis of a cost value.

6. The non-transitory machine-readable storage medium of claim 4, wherein the statistical analysis is used to infer another action to be performed as facilitated by the processor.

7. The non-transitory machine-readable storage medium of claim 1, wherein the artificial intelligence analyzes classification data associated with a classifier.

8. The non-transitory machine-readable storage medium of claim 7, wherein the classifier classifies in response to the facilitating of the performance of the action.

9. A method, comprising:
    receiving, by a system comprising a processor, from a universal integrated circuit card, registration rejection message data;
    analyzing, by the system using a result of an artificial intelligence analysis received from the universal integrated circuit card, classification data associated with a classifier to infer an action;
    initiating, by the system, a classifier function to facilitate a mapping of an input vector to a confidence value by the universal integrated circuit card, wherein the classifier employing the classifier function is implicitly trained to determine a time to update a criterion control in response to the registration rejection message data; and
    initiating, by the system, adjusting a predefined criterion based on the classification data by the universal integrated circuit card, wherein the adjusting the predefined criterion comprises adjusting the time to update the criterion control.

10. The method of claim 9, wherein the classifier function comprises a support vector machine.

11. The method of claim 10, wherein the support vector machine locates an input.

12. The method of claim 10, wherein the support vector machine facilitates distinguishing a triggering event from a non-triggering event.

13. The method of claim 9, wherein the classifier is a trained classifier.

14. The method of claim 9, wherein the classifier function comprises a support vector machine to determine, according to the predefined criterion, when to implement a tighter control than the criterion control.

15. The method of claim 14, wherein the support vector machine locates an input.

16. A system, comprising:
    a processor; and
    a memory that stores non-transitory executable instructions that, when executed by the processor, facilitate performance of operations, comprising:
        sending a registration rejection message to a universal integrated circuit card to facilitate an analysis of registration rejection data associated with the registration rejection message;
        performing an action based on a result of the analysis of the registration rejection data;
        in response to the action, employing artificial intelligence to perform another action associated with another analysis of classification data associated with a classifier, wherein the classifier classifies based on a probabilistic classification model, and wherein the classifier classifies in response to the performing of the action; and
        adjusting a criterion associated with the action, wherein the adjusting comprises adjusting a time value associated with the action.

17. The system of claim 16, wherein the action comprises executing a service provider application based on the registration rejection message.

18. The system of claim 16, wherein the action comprises instructing a mobile device to display the registration rejection data associated with the registration rejection message.

19. The system of claim 16, wherein the operations further comprise:

transmitting at least a portion of the registration rejection data, associated with a registration rejection cause, to a server associated with a service provider identity.

20. The system of claim 16, wherein the adjusting the time value is based on an indication of a system performance.

* * * * *